April 11, 1967  H. KRAUTKRÄMER  3,313,146
METHOD OF ULTRASONICALLY TESTING IRREGULARLY EXTENDING
WELDS, OR WELDS HAVING IRREGULAR PORTIONS, BY
THE PULSE ECHO METHOD
Filed Feb. 10, 1964                                   2 Sheets-Sheet 1
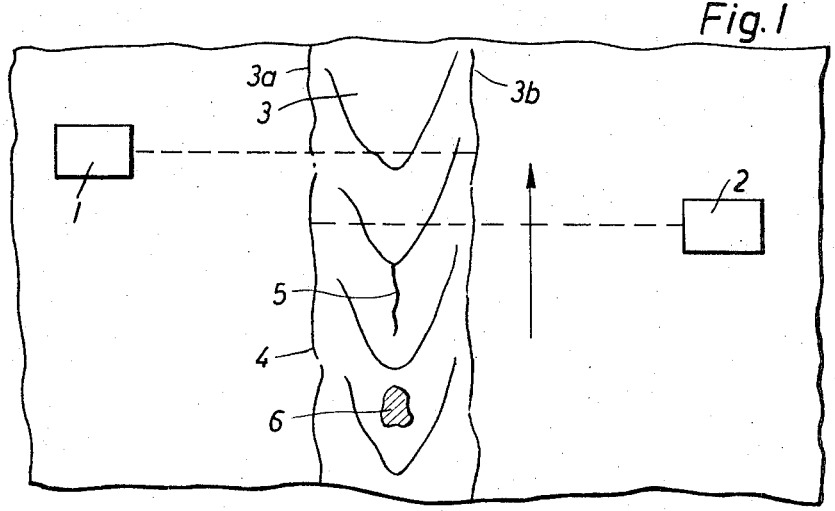
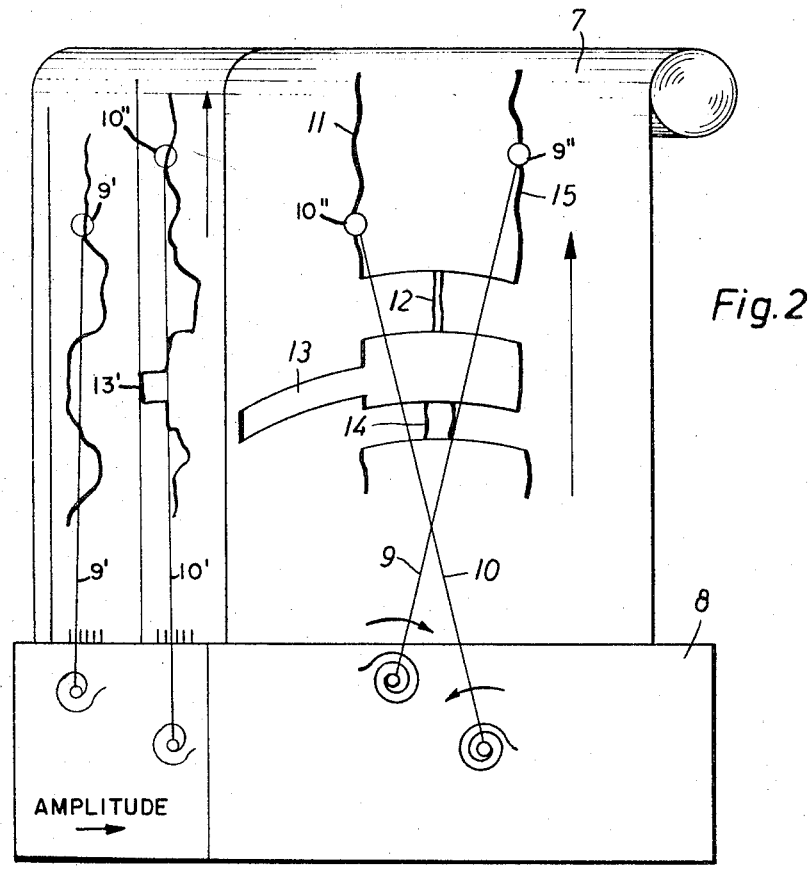
INVENTOR
Herbert Krautkrämer
BY Spencer & Kaye
ATTORNEYS

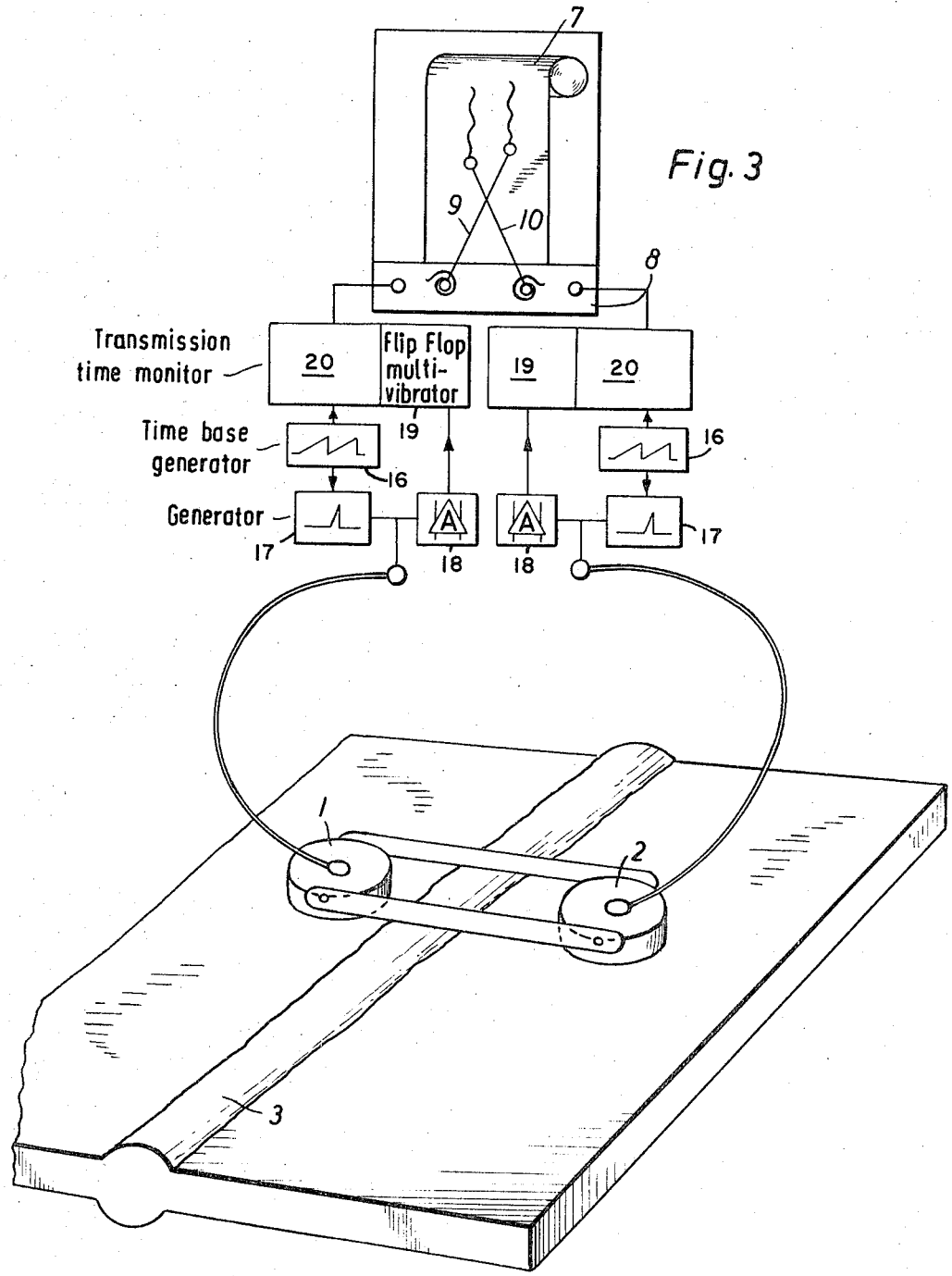

United States Patent Office 3,313,146
Patented Apr. 11, 1967

3,313,146
METHOD OF ULTRASONICALLY TESTING IR-REGULARLY EXTENDING WELDS, OR WELDS HAVING IRREGULAR PORTIONS, BY THE PULSE ECHO METHOD
Herbert Krautkrämer, 449 Luxemburger Str., Cologne-Klettenberg, Germany
Filed Feb. 10, 1964, Ser. No. 343,591
Claims priority application Germany, Feb. 12, 1963, K 48,917
3 Claims. (Cl. 73—67.8)

The invention relates to a method of ultrasonically testing irregularly extending welds, or welds having irregular portions, by the pulse echo method, wherein at least two testing probes, such as angle testing probes, are mounted on either side of the weld seam.

It is known to carry out weld testing by the ultrasonic pulse echo method, wherein a beam of ultrasonic pulses is, directed by one or more angle testing probes into the weld to be tested. The echoes are then presented on a fluorescent screen of the ultrasonic apparatus in the form of blips on a time base line known as A-scan, so that the transmission time can be read off.

It is furthermore known to employ certain auxiliary means, such as flaw locating rules, or measuring instruments, when scanning by an angle testing probe, in order that the position of each echo source may be better determined. Exact locating is necessary if, in addition to the flow, another point of reflection such as, for example, an unusually steep elevation of the weld is present. Since most weld seams comprise a bead, the hump of which may to a variable extent give rise to reflection of the ultrasonic pulses, this is the main difficulty in automation in weld testing.

It is known to carry out more or less automatic weld testing by guiding the testing probe along the seam at a constant distance from the center thereof. The central guiding must be continuously and carefully controlled in order to follow slow fluctuations of the center line of the seam, as well as to compensate for enlarged beads at the starting points of new welds. If the distance and the width of the seam remain constant the echoes reflected from the hump of the seam always appear at a certain point on the fluorescent screen, so that the echoes appearing at points representing shorter transmission times are reflected from flaws and can be distinguished. This testing method, however, is possible only with rectilinear welds, the width of which does not fluctuate, such as are produced for example by submerged arc welding.

The known method, however, is not applicable when the position and width of the weld seam fluctuates, as is the case, for example, with a manually welded seam. It is true that it is possible in such cases to measure each echo by determining the distance of the reflecting point from the testing probe on the basis of the transmission time, and inspecting this point visually on the workpiece in order to decide whether the echo was produced by a flaw or a steep flank of the bead. However, if the opposite side of the weld is inaccessible, as is the case with a circumferential tube seam, such inspection and checking are not possible.

In accordance with the invention, the aforesaid disadvantages are overcome by using a method of ultrasonically testing irregularly extending weld seams by the pulse echo method, wherein at least two testing probes, such as angle testing probes, are set on either side of the seam. These probes are displaced together and at the same rate, parallel to the mean direction of the weld seam while maintaining said probes a constant distance apart from each other. Two recording systems are used, one for each probe. The initial position of the deflection means of each recording system is chosen to correspond to the position of the associated testing probe, and the direction of deflection of said means is chosen to correspond to the sonic testing direction, that is, the direction of transmission and reflection of the sonic testing pulse. The echoes received from each testing probe are recorded separately by the recording system associated with that testing probe on a common recording tape, or chart. This is carried out so that the points of reflection appear on the chart true-to-position, by causing each recording system to have an echo response of an amplitude proportional to the pulse transmission time. The term "true-to-position" is used throughout the specification to mean that some line, angle or feature of the actual apparatus is reproduced on the chart as a similar line drawn to scale, or the same angle, etc. The advantageous result is thereby obtained that, so long as they reflect the ultrasonic beam, the two flanks of the seam hump become visible. Not more than two testing probes are required to achieve this. Any weld can in fact be semi-automatically or automatically tested and the actual flaws can be satisfactorily distinguished from the reflections of the flanks of the reinforcement. It is no longer necessary to measure the lateral position of the point of reflection in relation to the center of the seam, because the record of the echoes provides this information. A particular advantage of the method of the invention resides in that the scale of recording can be varied as desired in the direction of the length or the width of the seam. If the scale of reproduction is increased in the width of the seam, a narrow seam is more clearly represented than hitherto.

In a further development of the invention, it is proposed that, in addition to the position of the echoes, their amplitudes should also be recorded. This altogether more complete information regarding any flaws is obtained by recording the echo amplitude on the same recording tape by varying the recording, by separate recording systems or the like.

In a further development of the invention, there is proposed for carrying out the method an apparatus which employs, for example, ink recorders, the recording systems being so arranged that they correspond to the position of the testing probes in relation to the weld, and the deflections of their indicating parts correspond to the testing direction of the testing heads. These recording systems are controlled by transmission time monitors, which are well known in the art, and which convert the transmission time of the first echo into a voltage proportional to the transmission time. An advantage of this arrangement resides in that, as compared with a photographic recording, no development of the recording medium is necessary, and in addition a differently coloured ink may be employed for each recording system, so that information as to which testing probe is to be allocated to a particular echo trace is more readily provided.

It is therefore an object of the invention to provide a simple and convenient method for measuring imperfections in weld seams wherein no actual visual measurements need be made on the weld to determine the source of the echo pulses.

It is a further object of the invention to provide a method for testing weld seams for faults or irregularities wherein two or more ultrasonic testing probes are moved along a weld seam and the echoes from each are recorded by separate recording mechanisms on a chart, the amplitude of the indications being proportional to the transmission time of the testing pulses.

The subject of the invention will be described with reference to the following drawings, which diagrammatically illustrate embodiments, and in which:

FIGURE 1 is a plan view of a seam having testing probes set to the left and to the right thereof.

FIGURE 2 illustrates a record tape from a recording device, and the echo traces made by four pointers.

FIGURE 3 shows a perspective view of the testing probe arrangement, associated with the ultrasonic and recording equipment.

Two angle testing probes 1 and 2 are employed, which are at a constant fixed distance apart and are set to the left and right respectively of the weld seam 3. They are so set beside the weld seam that the latter is situated substantially in the center. The weld seam is perpendicularly irradiated. A weld hump is represented by the flanks 3a and 3b, the weld point 4 having no hump. The weld contains flaws, namely a crack 5 and a slag point 6. The testing probes 1 and 2 are displaced rectilinearly, in a direction substantially parallel to the mean direction of the seam and without regard to the centre of the seam. Simultaneously with this displacement, a record chart 7 of a recording instrument 8 is synchronously moved. The recording instrument 8 is provided with two separate recording systems 9, 9' and 10, 10', the recording system 9, 9' being allocated to the testing probe 1 and the recording system 10, 10' to the testing head 2. Each of the recording system portions 9 and 9' is provided with a stylus 9'', while each of the recording system portions 10 and 10' is provided with a stylus 10''. The first echo of each testing probe signal is applied, in accordance with its transmission time, as a signal voltage to the associated recording system portion 9 or 10, so that, for example, a low voltage corresponds to a short transmission time and therefore produces a small deflection.

To accomplish this, the time bsae generator 16 signals the generator 17, which sends a transmission pulse to the probe. The time base generator ramp signals is also fed to the transmission time monitor 20. The echo pulse responsive to the transmitted pulse is fed through one of the amplifiers 18 to reset the flip-flop 19, which signals the transmission time monitor to send an output voltage to actuate the recorder connected to it. If no echo is present on the fluorescent screen (see the point 4), the hump is lacking and the signal voltage has a maximum value, so that the recording system is fully deflected. Keeping in mind the known fact that only flaws and that steep blank of the head which is opposite the testing probe in the present example reflect the ultrasonic pulses, the recording takes place as follows: the region 11 of the echo trace is the recording of the flank 3a by the testing probe 2 with the air of the recording system portion 10. At the region 12 of the echo trace, the crack 5 is detected. The region 13 of the echo trace shows a recording corresponding to the point 4 of the seam where no flaw and no noticeable bead hump is present, i.e. the weld material forms a nearly flat surface with the welded bodies. The region 14 corresponds to the slag point 6. The first echo of the testing probe 1 is reproduced in the echo recording trace 15 of the recording system 9 and extends accordingly.

Recording system portion 9' derives its input from the first measuring probe 1 and recording system portion 10' derives its input from probe 2. These two recording system portions are arranged to be deflected in proportion to the amplitude of the received echo and trace their curves on the same record chart 7 as system portions 9 and 10. Thus, each of the lines traced by system portions 9' and 10' corresponds to the amplitudes of the pulses whose transit times are recorded by the system portions 9 and 10, respectively. As may be seen, system portion 10' is given for example, a deflection substantially equal to zero in the region 13', which corresponds to the relatively flat weld region 4 shown in FIGURE 1.

The invention is not limited to the merely exemplary embodiments described in the foregoing. It is also possible to employ additional testing probes which inject energy at different angles in relation to the seam and whose echoes are recorded true-to-position in the same reproduction by correspondingly arranged recording systems, so that greater perfection is achieved, and flaws which cannot be satisfactorily detected with a testing direction perpendicular to the seam, such as transverse cracks, are also picked up.

These methods operate satisfactorily as long as a seam having sufficiently strong humps in the form of the flanks 3a and 3b is present to provide clear echoes (recordings 11 and 12) from the two edges of the hump. With a smooth seam, however, no hump is present, and accordingly there is no reocrding, such as at point 13, so that the allocation of the fault recordings to the seam is rendered difficult.

This disadvantage is overcome in accordance with a further development of the invention by means of an arrangement by which the aforesaid method may also be carried out with weld seams having a smooth bead. For this purpose, it is proposed that, in addition to the testing heads which check the weld seam for welding faults, surface wave testing probes be so arranged that surface wave echoes may be recorded true-to-position in relation to one another and in relation to the other recordings.

The surface waves which may be generated, such as compression and shear ultrasonic waves, travel only along the surface and are reflected from the edges and notches. Since, in the usual butt weld seams, a slight but sharp depression is formed in the surface at the transition from the parent material to the weld material, the surface waves are reflected here. If the recording of these echoes is carried out by the original method, the edges of the weld seam are more clearly shown even with smooth seams, which substantially facilitates the evaluation of the recording, especially if this recording is effected by means of a different colored ink. Such surface waves may be generated, for example, by an angled testing head, the angle of which is greater than the angle for total reflection of shear waves. The angle is measured with respect to the normal.

What I claim is:

1. A method of ultrasonically testing irregularly extending weld seams or weld seams having irregular portions by the pulse echo method, comprising the steps of: placing at least two testing probes on opposite sides of a seam to be tested; disposing two recording systems, each provided with a recording stylus, adjacent a single recording surface with the styli in writing relationship with the surface; adjusting each recording system so that its associated stylus assumes a non-deflected position which corresponds to the location of a respective probe with regard to the weld to be tested; displacing the probes in unison relative to the weld in the mean direction of the weld seam, while maintaining the probes a constant distance apart, and simultaneously displacing the recording surface with respect to the styli in synchronism with the displacement of the probes; recording the echo signals from each probe by a respective recording system by deflecting the stylus of the recording system, in response to the echo signals, in a direction which bears the same relation to the direction of displacement of the recording surface as the direction of travel of sonic pulses from the respective probe bears to the direction of displacement of the seam relative to the probes.

2. A method as defined in claim 1 comprising the further step of recording the amplitudes of the echo signals of each probe.

3. A method as defined in claim 1 wherein each stylus is deflected by an amount proportional to the time delay between the emission of each pulse and reception of the resulting echo by its respective probe.

(References on following page)

References Cited by the Examiner

UNITED STATES PATENTS

| | | | |
|---|---|---|---|
| 2,325,451 | 7/1943 | Wait | 346—46 X |
| 2,912,854 | 11/1959 | Schubring | 73—67.7 |
| 3,056,286 | 10/1962 | Gibson et al. | 73—67.8 |
| 3,135,109 | 6/1964 | Werner | 73—67.8 |
| 3,169,393 | 2/1965 | Stebbins | 73—67.9 |

FOREIGN PATENTS

| | | |
|---|---|---|
| 912,226 | 12/1962 | Great Britain. |
| 1,306,285 | 9/1962 | France. |

RICHARD C. QUEISSER, *Primary Examiner.*

J. P. BEAUCHAMP, *Assistant Examiner.*